United States Patent [19]
Joung

[11] Patent Number: 5,855,796
[45] Date of Patent: Jan. 5, 1999

[54] WATER DISCHARGING CONTROL DEVICE AND METHOD FOR WATER PURIFIER TANK

[75] Inventor: Geum-Suk Joung, Suwon, Rep. of Korea

[73] Assignee: Samsung Electronics Co., Ltd., Suwon, Rep. of Korea

[21] Appl. No.: 774,875

[22] Filed: Dec. 27, 1996

[30] Foreign Application Priority Data

Mar. 30, 1996 [KR] Rep. of Korea ............... 1996 9400

[51] Int. Cl.⁶ ............................................... B01D 17/12
[52] U.S. Cl. ........................... 210/744; 210/97; 210/248; 210/257.1
[58] Field of Search ................. 210/86, 94, 97, 210/138, 143, 248, 257.1, 257.2, 744, 104; 261/111, DIG. 11, DIG. 46; 137/395, 590, 624.11, 624.12

[56] References Cited

U.S. PATENT DOCUMENTS

3,292,650 12/1966 Bird et al. .................... 137/624.11
3,592,212 7/1971 Schleimer et al. ............. 261/DIG. 46
4,160,727 7/1979 Harris ............................ 210/744
4,801,375 1/1989 Padilla .......................... 210/138
5,294,916 3/1994 Bolton et al. ................. 261/DIG. 11
5,676,824 10/1997 Jeon et al. ..................... 210/138

Primary Examiner—Joseph W. Drodge
Attorney, Agent, or Firm—Burns, Doane, Swecker & Mathis, L.L.P.

[57] ABSTRACT

The present invention relates to a water purifier for removing noxious pollutant substances contained in fresh water, such as tap water, to purify the water, and more particularly to a water discharging control device for a water purifier, that is capable of correctly determining an appropriate time for completing a water discharging operation on the basis of a residual amount of contaminated water remaining in a water tank, thereby correctly performing the water discharging operation for, for example, purified water which has been stored in the water tank for a long time.

4 Claims, 6 Drawing Sheets

WATER DISCHARGING CONTROL DEVICE AND METHOD FOR WATER PURIFIER TANK

BACKGROUND OF THE INVENTION

1. Field of the Invention

The present invention relates to a water purifier for removing noxious pollutant substances contained in fresh water such as tap water to purify the water, and more particularly to a water discharging control device for a water purifier, being capable of correctly determining an appropriate time for finishing the water discharging operation on the basis of the residual amount of contaminated water in a water tank, thereby correctly performing the water discharging operation for purified water which stored in the water tank for a long time.

2. Description of the Prior Art

Typically, water purifiers are used to remove noxious pollutant substances contained in fresh water such as tap water, in order to supply purified water. They are classified into a natural filtering type, a forced filtering type, and ion exchanging resin type and a reverse osmotic type in accordance with the methods for purifying water.

Water purifiers of the reverse osmotic type, which force fresh water to pass through an artificial osmotic membrane (reverse osmotic filer) while applying pressure to the fresh water, can remove heavy metals, bacteria, cancer-causing materials and the like contained in the water, thereby purifying the water. Since the reverse osmotic water purifiers can supply pure water containing only dissolved oxygen, they have been used in fields such as super-pioneering scientific industry, medical science or cleaning for super-precise electronic elements. Recently, such reverse osmotic water purifiers have widely been used as domestic water purifier for supplying drinkable water.

Figure 1:
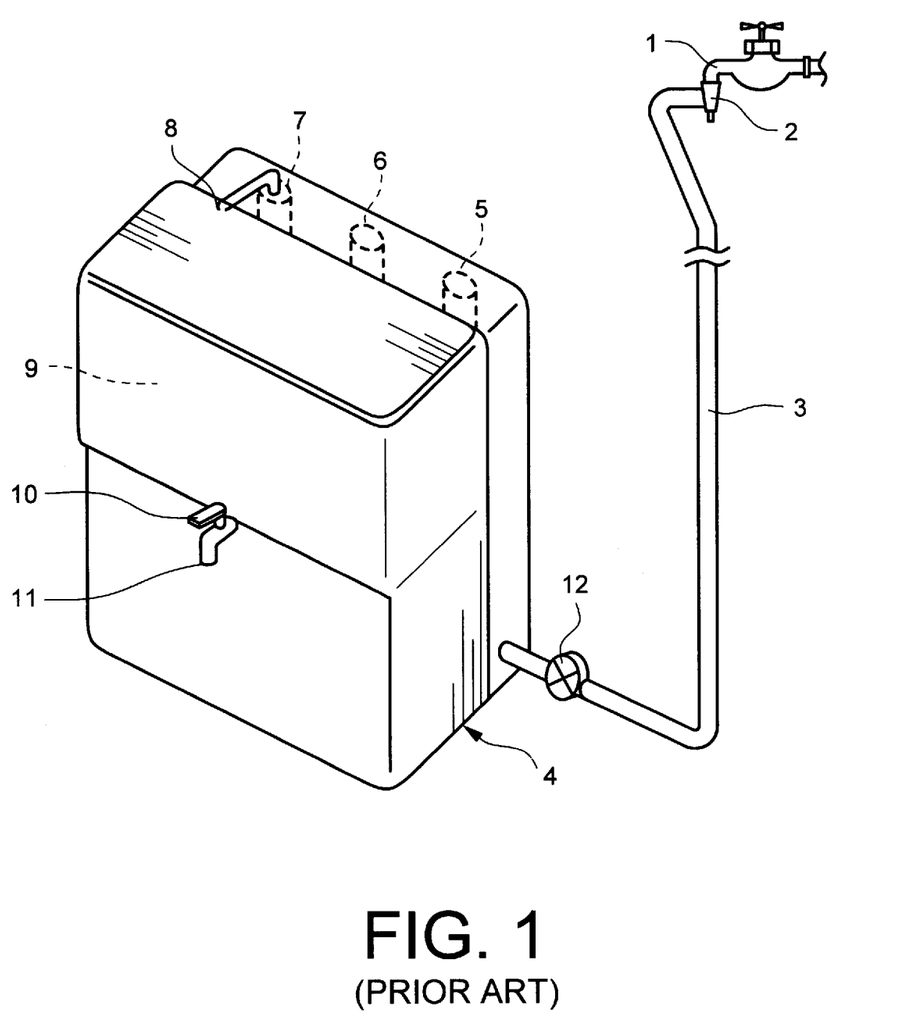
FIG. 1 is a perspective view illustrating the overall construction of a conventional water purifier.

FIG. 1 illustrates a conventional reverse osmotic water purifier having the above-mentioned function. As shown in FIG. 1, the water purifier includes a purifier body 4 which is connected to a faucet 1 via a water supply pipe 3. This water supply pipe 3 is coupled to the faucet 1 by means of an adapter 2. The purifier body 4 is supplied with fresh water, such as tap water, from the faucet 1 through the water supply pipe 3. The fresh water introduced in the purifier body 4 passes through a pre-processing filter 5 disposed at the rear portion of the purifier body 4. The pre-processing filter 5 removes various harmful organic chemical materials such as chlorine components and the like from the water passing therethrough. The water emerging from the pre-processing filter 5 then passes through a water supply valve which controls the amount of the water supply. The water from the water supply valve is then introduced in a pressure pump so that it can be pressurized to a certain pressure level. The pressurized water is then fed to a membrane filter 6 including a plurality of membranes (not shown). While passing through the membranes, the water becomes free of heavy metals, bacteria, cancer-causing materials and the like contained therein. The water emerging from the membrane filter 6 then passes through a post-processing filter 7 by which odorous substances such as noxious gas are removed from the water.

The water, which has a pleasant taste as it becomes free of odorous substances such as noxious gas while passing through the post-processing filter 7, is then fed to a water tank 9 through a water supply port 8.

When the purified water is supplied in the water tank 9, it is determined whether the amount of water contained in the water tank 9 corresponds to a full water level (namely, the maximum water amount required to shut off the supply of purified water to the water tank) or an empty water level (namely, the minimum water amount required to supply purified water to the water tank).

Where the amount of water contained in the water tank 9 corresponds to the full water level, the supply of purified water to the water tank 9 is shut off. On the other hand, where the amount of water in the water tank 9 corresponds to the empty water level, the water tank 9 is supplied with purified water. In such a manner, the water tank 9 is always stored with a constant amount of purified water.

The purified water stored in the water tank 9 can be discharged through a discharge port 11 by manipulating a water discharge lever 10 so that it will be drinkable.

Figure 2:
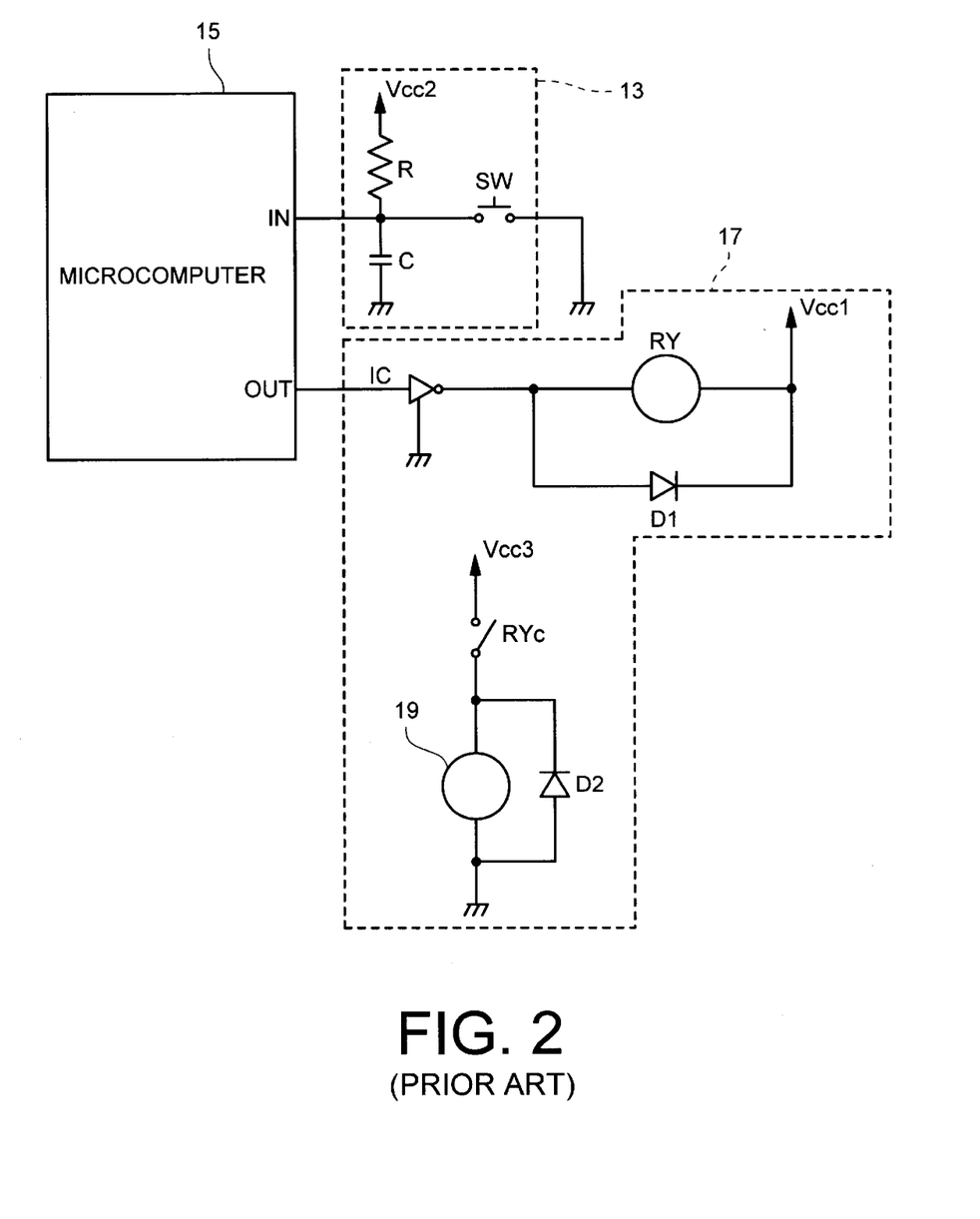
FIG. 2 is a detailed circuit of the water discharging control device according to the prior art.

FIG. 2 is a detailed circuit of a water discharging control device in accordance with the prior art.

As shown in FIG. 2, the device includes a water discharging manipulating unit 13 having a water discharging switch SW, a resistor R and a capacitor C, and a microcomputer 15 for controlling the water discharging operation on the basis of a signal output from the water discharging manipulating unit 13. The microcomputer 15 receives the signal through an input terminal IN thereof.

The device also includes a valve driving unit 17 having an inverter IC, a relay RY, diodes D1 and D2, and a water discharging valve 19 so that purified water in the water tank 9 is discharged by a control signal output from an output terminal OUT of the microcomputer 15.

The water discharging control device having the above-mentioned construction is operated as follows.

Once the water discharging switch SW is turned on, and then the microcomputer 15 receives a low level signal through the input terminal IN thereof. Therefore, the microcomputer 15 outputs a high level signal to the valve driving unit 17 through the output terminal OUT thereof, so that purified water in the water tank 9 is discharged.

The high level signal output from the microcomputer 15 is inverted to the low level signal by the inverter IC, thereby being applied to the relay RY. Therefore, a contact terminal RYc of the relay RY is closed, thereby being applied the DC voltage Vcc3 to the water discharging valve 19 through the contact terminal RYc. Therefore, the water discharging valve 19 is opened, thereby being discharged contaminated water in the water tank 9 through a water discharging pipe (not shown).

Meanwhile, the microcomputer 15 determines whether or not the water discharging time is lapsed a predetermined time previously stored therein while being discharged the putified water. The time is counted by a timer previously equipped in the microcomputer 15.

As a result, when the microcomputer 15 determines that the water discharging time has been reached the predetermined time, the microcomputer 15 output a control signal to the valve driving unit 17, thereby closing the water discharging valve 19.

In accordance with the control signal, the valve driving unit 17 cuts off the source voltage being applied to the water discharging valve 19, thereby closing the water discharging valve 19.

The above-described prior art, however, the amount of contaminated water in the water tank does not comply with the predetermined time previously stored in the microcomputer because the water discharging operation is performed for time as many as the predetermined time. That is, there are frequent occassions when it becomes to perform the water discharging operation even after the contaminated water in the water tank is completely discharged.

On the other hand, there are frequent occassions when it becomes not to perform the water discharging operation, nevertheless, the contaminated water in the water tank is not completely discharged.

SUMMARY OF THE INVENTION

Therefore, an object of the invention is to solve the above-mentioned problems and to provide a water discharging control device for a water purifier, capable of correctly determining an appropriate time for finishing the water discharging operation on the basis of the residual amount of contaminated water in the water tank, thereby correctly performing the water discharging operation.

In accordance with the present invention, this object is accomplished by providing in a water purifier including a pre-processing filter, a membrane filter, a post-processing filter and a pressure pump, to purify fresh water while passing the water through the pre-processing filter, the membrane filter and the post-processing filter, in this order, by an operation of the pressure pump, a water discharging control device comprising: key manipulating means for inputting a command signal corresponding to the water discharging operation to discharge contaminated water in a water tank; valve driving means for driving a water discharging valve to discharge the contaminated water in the water tank in accordance with the command signal; water level sensing means for sensing the amount of the contaminated water in the water tank when the water discharging operation is to be performed; control means for determining an appropriate time for performing the water discharging operation to completely discharge the contaminated water in the water tank on the basis of the signal sensed by the water amount sensing means, and controlling the overall operation of the water purifier; and informing means for informing to a user the fact that the water discharging operation is completely finished under a control of the control means.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENT

Figure 3:
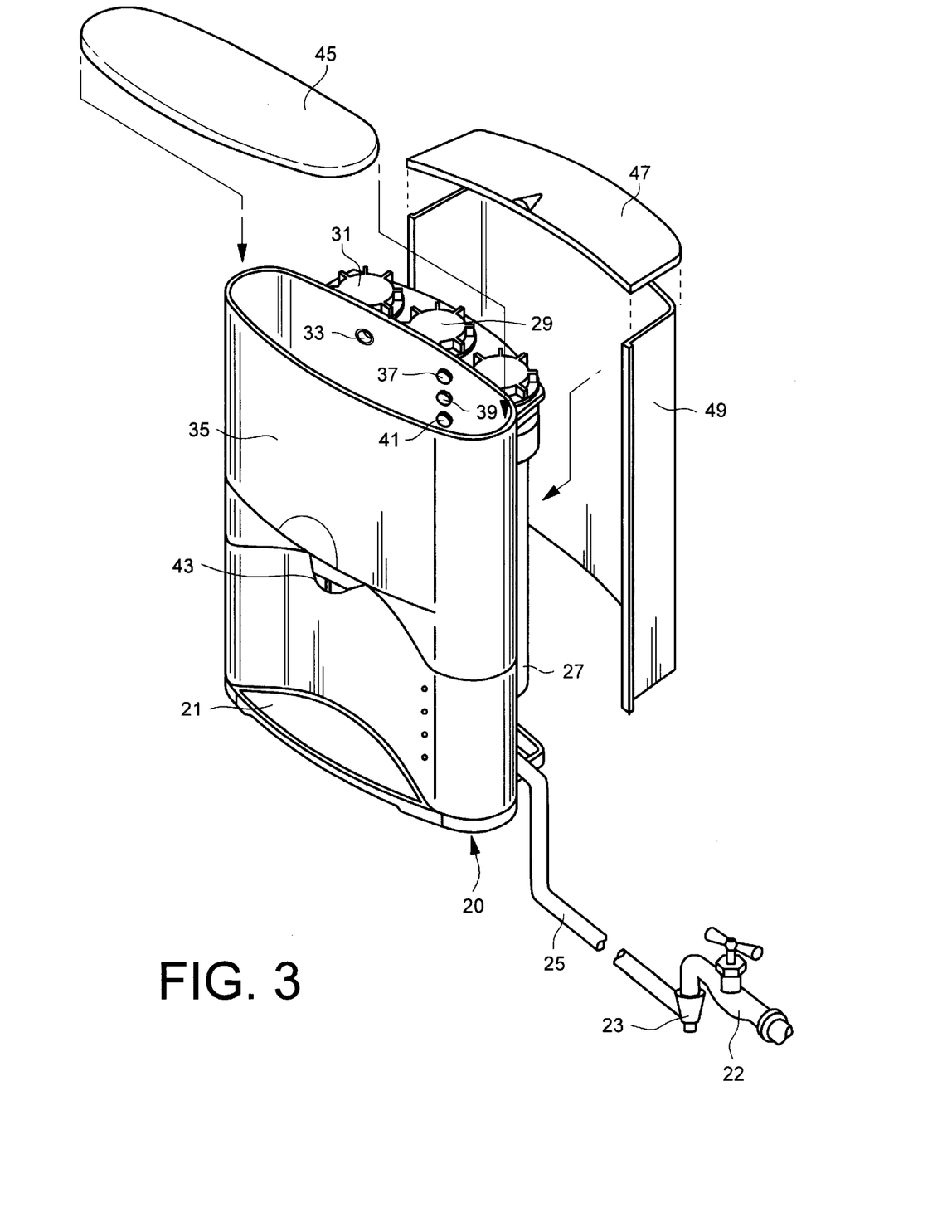
FIG. 3 is an exploded perspective view illustrating a water purifier to which a water discharging control device according to an embodiment of the present invention is applied.

FIG. 3 illustrates a water purifier to which water discharging control device according to an embodiment of the present invention is applied.

In FIG. 3, the reference numeral 20 denotes a body of the water purifier. The purifier body 20 is provided at its front portion with a cup receiving portion 21 for receiving a water receptacle such as cup.

At the rear side of the purifier body 20, a water supply pipe 25 is connected at one end to the purifier body 20. The other end of the water supply pipe 25 is connected to a faucet 22 by means of a connecting member 23. In the purifier body 20, a pre-processing filter 27 is disposed. The pre-processing filter 27 is connected to the water supply pipe 25 and adapted to remove various harmful organic chemical substances such as chlorine components and the like from fresh water supplied from the faucet 22.

At one side of the pre-processing filter 27, a membrane filter 29 is disposed which includes a plurality of membranes (not shown) serving to remove heavy metals, bacteria, cancer-causing materials and the like contained in the water emerging from the pre-processing filter 27. A post-processing filter 31 is connected to the membrane filter 29 to remove odorous substances, such as noxious gas, contained in the water emerging from the membrane filter 29.

A water tank 35 is separably seated on the purifier body 20. The water tank 35 has a water inlet port 33 to receive and store the water purified by the post-processing filter 31. The water tank 35 is also provided at its inner rear surface with a pair of water level sensors 37 and 39 respectively adapted to sense different amounts of purified water stored in the water tank 35 corresponding to the full and empty water levels.

A water discharge lever 43 is coupled to the front surface of the water tank 35 to discharge the purified water stored in the water tank 35 through a water discharge port (not shown). The water tank 35 is covered at its top portion with an upper cover 45. At the rear side of the upper cover 45, another upper cover 47 is separably coupled to the top portion of the purifier body 20. At the rear side of the purifier body 20, a rear cover 49 is also coupled to the purifier body 20.

In FIG. 3, the reference numeral 41 denotes a ground terminal for the water level sensors 37 and 39.

Figure 4:
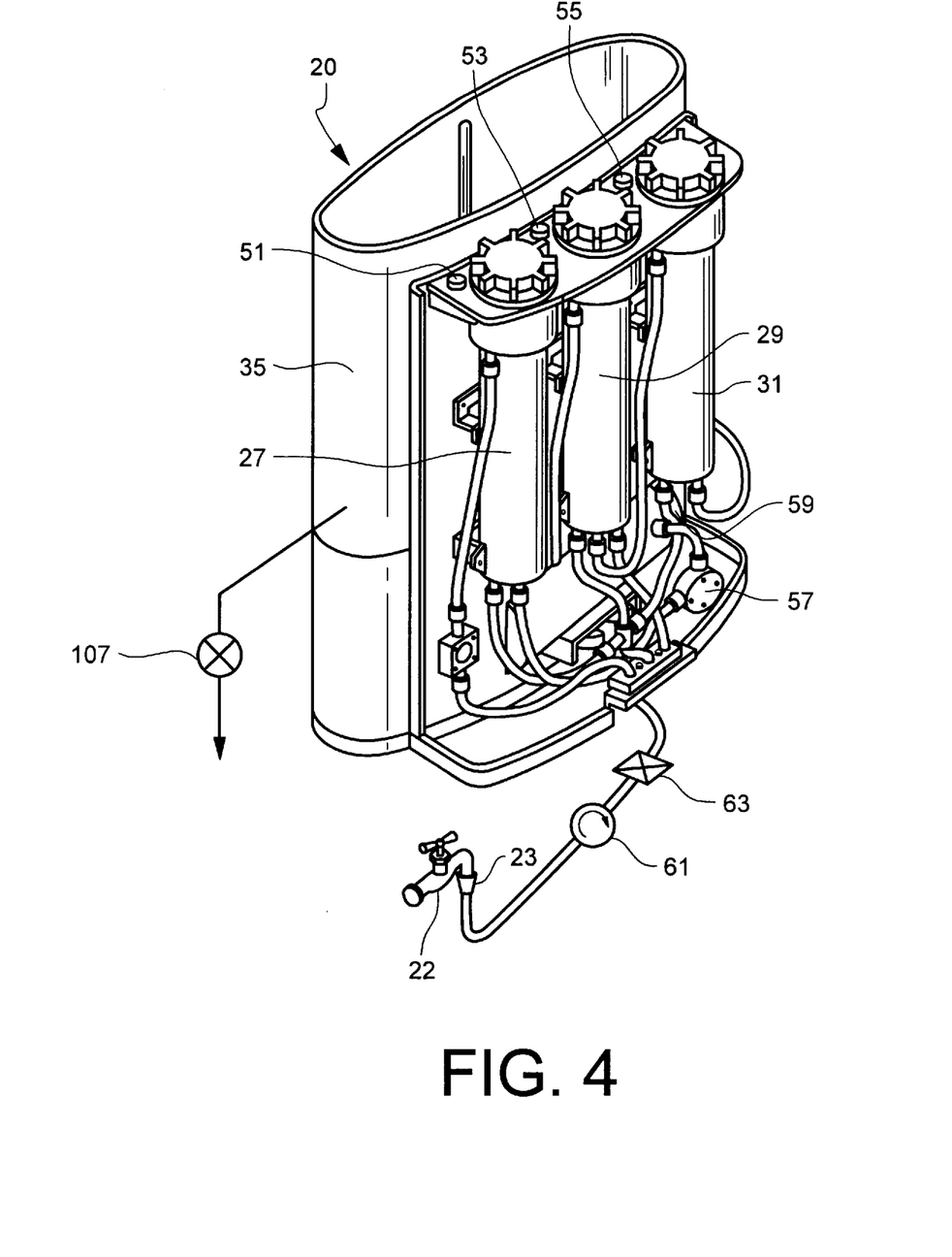
FIG. 4 is a rear perspective view of the water purifier according to the present invention.

As shown in FIG. 4 at the upper side of the pre-processing filter 27, membrane filter 29, and post-processing filter 31, reset switches 51, 53 and 55 are disposed to reset the used time of the filters, respectively, when the filters are to be replaced with new filters.

Beneath the post-processing filter 31, a water supply valve 57 is disposed, which is connected between the post-processing filter 31 and the water tank 35, as shown in FIG. 3. The water supply valve 57 is opened and closed in accordance with the amount of purified water contained in the water tank 35, namely, the water level of the water tank 35. A pressure pump 59 is connected between the pre-processing filter 27 and the membrane filter 29 to apply a certain pressure to the water emerging from the pre-processing filter 27, thereby feeding the water to the membrane filter 29 at the certain pressure. Since water under pressure is fed to the membrane filter 29 by the pressure pump 53, it can be purified by the membrane filter 29 in a reverse osmotic manner.

The pressure pump 53 is driven or stopped in accordance with the pressure of fresh water supplied from the faucet 22 to the water supply pipe 25 via the connecting member 23. That is, the pressure pump 53 is driven when the pressure of fresh water is at a predetermined high level and stopped when the pressure of fresh water is at a predetermined low level.

Figure 5:
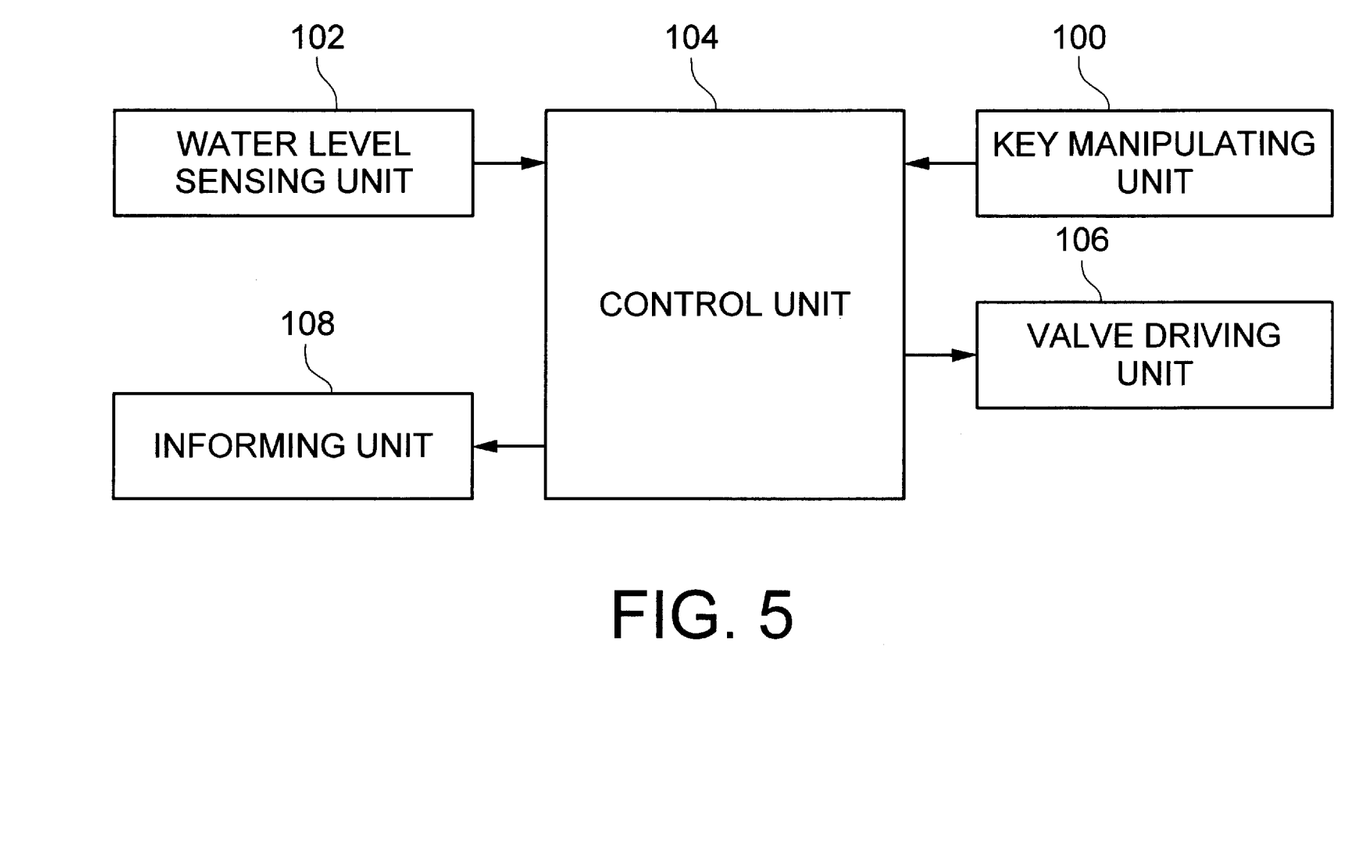
FIG. 5 is a block diagram illustrating the water discharging control device according to the present invention.

FIG. 5 is a block diagram illustrating the water discharging control device according to the present invention.

Figure 6:
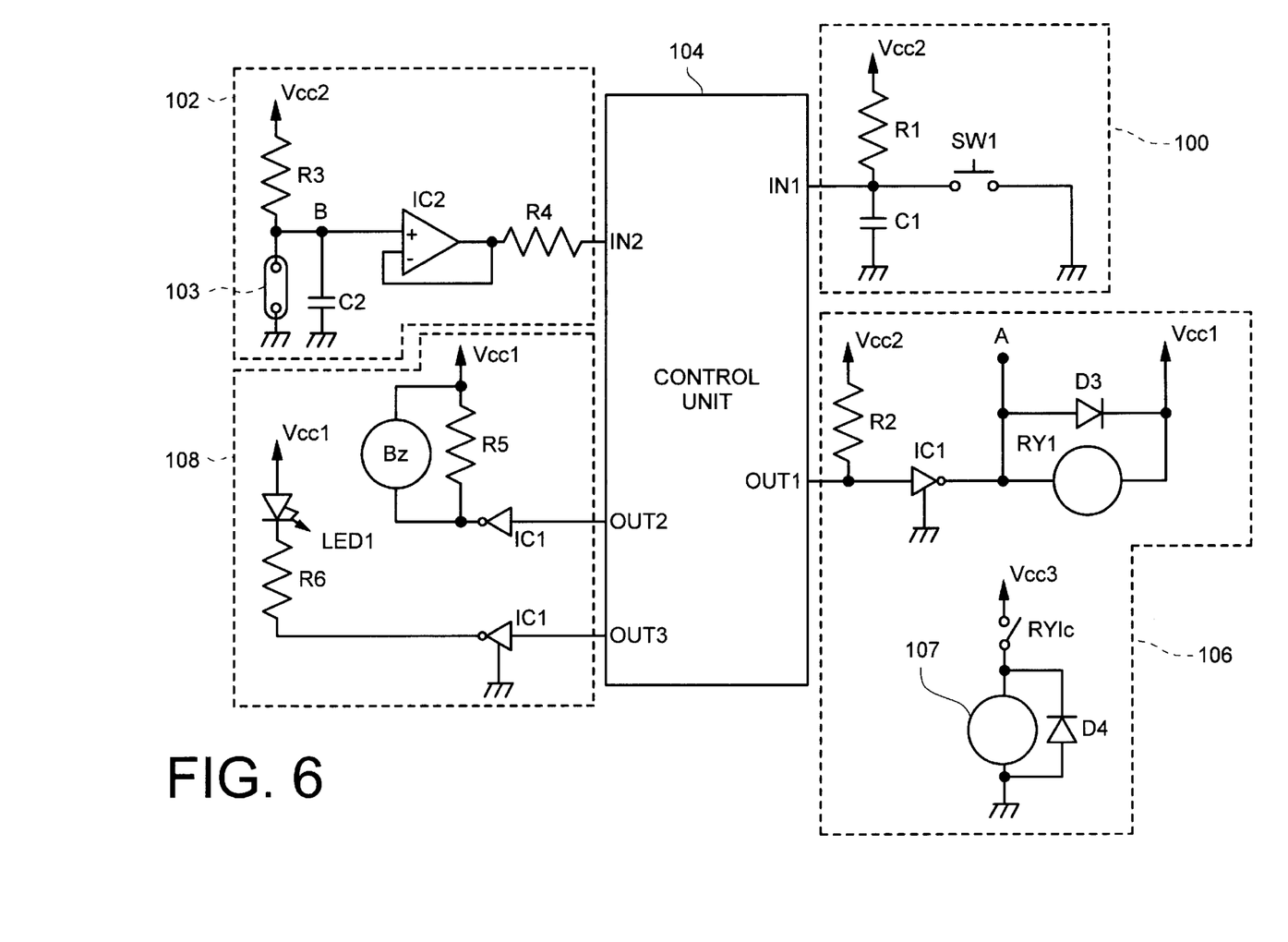
FIG. 6 is a detailed circuit of the water discharging control device according to the present invention.

FIG. 6 is a detailed circuit of the water discharging control device according to the present invention.

As shown in FIGS. 5 and 6, the water discharging control device includes a key manipulating unit 100 having a water discharging switch SW1, a resistor R1 and a capacitor C1 for selecting water discharging operation. The water discharging control device also includes a water level sensing unit 102 for sensing the amount of residual water in the water tank 35, namely, the water level of the water tank 35.

The water level sensing unit 102 comprises a residual water sensor 103 for sensing the amount of residual water in the water tank 35 by the amount of current changing between two metal sensing rods, an impedance amplifier IC2 and a capacitor C2 for amplifying the voltage divided by the residual water sensor 103 and a resistor R3 in order to be kept constantly a voltage difference, and a resistor R4 for inputting a voltage signal amplified by the impedance amplifier IC2 into an input terminal IN2 of a control unit 104.

Both the key manipulating unit 100 and water level sensing unit 102 are coupled to the control unit 104.

This control unit 104 serves to receive signals input from the key manipulating unit 100 for operating the water purifier.

This control unit 104 also receives a residual water level sensing signal from the water level sensing unit 102 and controls the water discharging operation of the water purifier on the basis of the received operational signal and the residual water level sensing signal. The control unit 104 is a microcomputer.

A valve driving unit 106 is also coupled to the control unit 104 to control a water discharging valve 107. The valve driving unit 106 includes an inverter IC1, a relay RY1, diodes D3 and D4, a resistor R2 and the water discharging valve 107.

The valve driving unit 106 receives a control signal which is generated from the control unit 104 in accordance with the residual water level of the water tank 35 sensed by the water level sensing unit 102.

The water discharging control device further includes an informing unit 108 which receives various control signals generated from the control unit 104 through output terminals OUT2 and OUT3 and displays the operation conditions respectively corresponding to the received control signals so that the user can easily check the operatiing state of the water purifier.

The informing unit 108 includes an inverter IC1, resistors R5 and R6, a water discharging lamp LED1 and a buzzer Bz.

The operation of the water discharging control device having the above-mentioned construction will now be described.

Once the water purifier is powered, the DC power supply unit not shown converts a source voltage received from a commercial AC power source at its AC power input stage (not shown) into a DC voltage with a voltage level required to drive the water purifier. The DC voltage from the DC power supply unit is then applied to the control unit 104 as well as various driving circuits.

Upon receiving the DC voltage from the DC power supply unit, the control unit 104 initializes the water purifier. The water level sensing unit 102 senses the amount of water stored in the water tank 35, namely the water level of the water tank 35. Water level data from the water level sensing unit 102 is sent to the control unit 104.

It is then determined whether or not the water level of the water tank 35 sensed by the water level sensing unit 102 is higher than a predetermined empty water level. This determination is achieved by the control unit 104 which receives a resistance value sensed by the empty water level sensor 39 mounted at the inner rear surface of the water tank 35 and then discriminates, on the basis of the received resistance value, whether or not the water level of the water tank 35 is higher than the predetermined water level.

When the water level of the water tank 35 is determined as being higher than the predetermined empty water level, the water purifier is entered into a standby state for its water purifying operation until the water level of the water tank 35 is lower than the predetermined empty water level.

On the other hand, where the water level of the water tank 35 is determined as not being higher than the predetermined empty water level, the control unit 104 applies, to the water supply valve 57, a control signal to be opened so that purified water can be supplied to the water tank 35.

Accordingly, the water supply valve 57 is supplied with the source voltage under the control of the control unit 104, thereby being opened same.

When the water supply valve 57 is opened, fresh water, such as tap water, from the faucet 22 is supplied to the water supply pipe 25 via the connecting member 23.

At this time, the control unit 104 drives the water pressure pump 59 by its control signal, thereby increasing the pressure of fresh water to a certain pressure.

Subsequently, the water purifying operation of the water purifier is executed. That is, the water introduced in the water supply pipe 25 by virtue of the water supply valve 57 being opened passes through the pre-processing filter 27 which, in turn, removes various harmful organic chemical materials contained in the water. The water emerging from the pre-processing filter 27 is then introduced in the membrane filter 29 through the water supply valve 57.

While passing through the membranes of the membrane filter 29, the water becomes free of heavy metals, bacteria, cancer-causing materials and the like contained therein.

The water emerging from the membrane filter 29 then passes through the post-processing filter 31 by which odorous substances such as noxious gas are removed from the water. The water from the post-processing filter 31 is then supplied to the water tank 35 through the water inlet port 33.

Following this water purifying operation, the water level sensing unit 102 senses the amount of water supplied to the water tank 35 through the water inlet port 33, namely, the water level of the water tank 35 and sends data indicative of the sensed water level to the control unit 104.

The control unit 104 then determines whether or not the water level of the water tank 35 sensed by the water level sensing unit 102 is higher than a full water level. In other words, the control unit 104 receives a resistance value sensed by the full water level sensor 37 mounted to the inner rear surface of the water tank 35 and then discriminates, on the basis of the received resistance value, whether or not the water level of the water tank 35 is lower than the full water level.

When the water level of the water tank 35 is determined as being higher than the full water level, the control unit 104 applies a control signal for stopping the pressure pump 59, thereby stopping the water purifying operation.

Therefore, the water tank 35 is always stored with a constant amount of purified water.

While executing the water purifying operation, the appropriate action is taken when there is bad smell from purified water or when some foreign materials are found out in purified water.

That is, the water discharging switch SW1 is turned on by the user, thereby inputting a low level signal to the control unit 104 through the input terminal IN1.

Therefore, the control unit 104 outputs a high level signal to the inverter IC1 through the output terminal OUT1 thereof, thereby being inverted to the low level signal.

The low level signal from the inverter IC1 activates the relay RY1, thereby being closed the terminal RY1c.

Therefore, DC electric power source $Vcc_3$ being supplied from the external source is applied to the water discharging valve 107 through the terminal RY1c, thereby opening the water discharging valve 107.

In accordance with the opening of the water discharging valve 107 contaminated water in the water tank 35 is discharged outside through the water discharging pipe not shown.

Simultaneously with the opening of the water discharging valve 107 the residual water sensor 103 senses the amount of purified water in the water tank 35, that is water level which is residued in the water tank 35. The sensed value, that is sensed voltage is divided by the resistor R3. The divided voltage is amplified through the capacitor C2 and the impedance amplifier IC2, and is inputted to the control unit 104 through the input terminal IN2.

Therefore, the control unit 104 compares the amplified voltage input from the impedance amplifier IC2 with the predetermined voltage previously stored therein to determine an appropriate time for completely performing the water discharging operation.

When the water discharging operation for the appropriate time which is determined on the basis of the result of determination by the control unit 104 is completely performed, an electric potential at the point B is changed from "L" mode to "H" mode.

Therefore, the control unit 104 determines the contaminated water in the water tank 35 is completely discharged, and outputs a low level signal to the valve driving unit 106 through the output terminal OUT1 thereof.

In accordance with the low level signal from the control unit 104 the valve driving unit 106 cuts off the source voltage being supplied to the water discharging valve 107, thereby closing the water discharging valve 107.

Simultaneously with the closing of the water discharging valve 107 the control unit 104 outputs a control signal to the informing unit 108 through the output terminals OUT2 and OUT3 thereof, thereby informing to the user the fact that the contaminated water in the water tank 35 is completely discharged.

In accordance with the control signal from the control unit 104 the lamp LED1 is turned on, and at the same time the buzzer Bz generates an alarm to be easily acknowledged the complete water discharging state by the user.

Meanwhile, when it is determined that the contaminated water in the water tank 35 has not completely discharged despite that it has been lapsed the predetermined time set on the basis of the result of determination by the control unit 104, the control unit 104 outputs a control signal to the valve driving unit 106, thereby closing the water discharging valve 107, and at the same time outputs a control signal to the informing unit 108 to inform to the user the fact that there has been something wrong state in the water purifier. In case of this, not only the lamp LED1 may be designed to perfome a different operation from the complete water discharging state, but also the buzzer Bz may be designed to generate different sound so that the user can easily check an abnormal state of the water purifier.

As apparent from the above description, the present invention provides a water discharging control device for a water purifier, capable of correctly determining an appropriate time for finishing the water discharging operation on the basis of the residual amount of contaminated water in the water tank, thereby being correctly performed the water discharging operation.

Having described specific preferred embodiment of the invention with reference to the accompanying drawings, it is to be understood that various changes and modifications may be effected therein by one skilled in the art without departing from the scope or spirit of the invention as defined in the appended claims.

What is claimed is:

1. A method for discharging contents from a water tank in a water purifier during purifier operation in response to an occurrence independent of sensed water tank level, the method comprising the steps of:

sensing a level of the contents of the water tank and generating a level signal corresponding thereto;

calculating a duration period for operation of a draining mechanism to discharge the tank contents based on the level signal; and operating said draining mechanism in accordance with said duration period.

2. In a water purifier including a pre-processing filter, a membrane filter, a post-processing filter and a pressure pump to purify fresh water, a water tank for storing the purified fresh water, a valve connected to the tank for emptying the tank, and a water discharge control device for discharging contaminated water from the tank, the control device comprising:

key manipulating means for inputting a water discharge command signal corresponding to a water discharging operation, independent of amount of water in the tank, to discharge contaminated water from the tank;

valve driving means connected to the valve for opening/closing the valve to perform a water discharge operation;

water level sensing means for sensing the amount of contaminated water in the tank;

control means connected to the key manipulating means, the valve driving means and the water level sensing means, for opening the valve in response to the water discharge command signal, and closing the valve in response to a signal from the water level sensing means corresponding to the tank being empty; and informing means connected to the control means for receiving a signal therefrom corresponding to a completion of the water discharge operation and for providing an indication of such completion.

3. The device in accordance with claim 2, wherein the informing means comprises a lamp and a buzzer to inform the user of at least one of a complete water discharge state and an abnormal state of the water purifier.

4. The device in accordance with claim 2 wherein the control means is operable to determine a duration of a water discharge operation and to stop the water discharge operation in the absence of the signal from the water level sensing means within the duration, and to cause the informing means to provide an indication of system malfunction.

* * * * *